Dec. 26, 1950          K. R. BATT          2,535,384

INERTIA CUTOFF SWITCH FOR VEHICLES

Filed June 2, 1949          2 Sheets—Sheet 1

Kenneth R. Batt

INVENTOR

BY *John H. Gaynor*

ATTORNEY

Dec. 26, 1950  K. R. BATT  2,535,384
INERTIA CUTOFF SWITCH FOR VEHICLES
Filed June 2, 1949  2 Sheets-Sheet 2
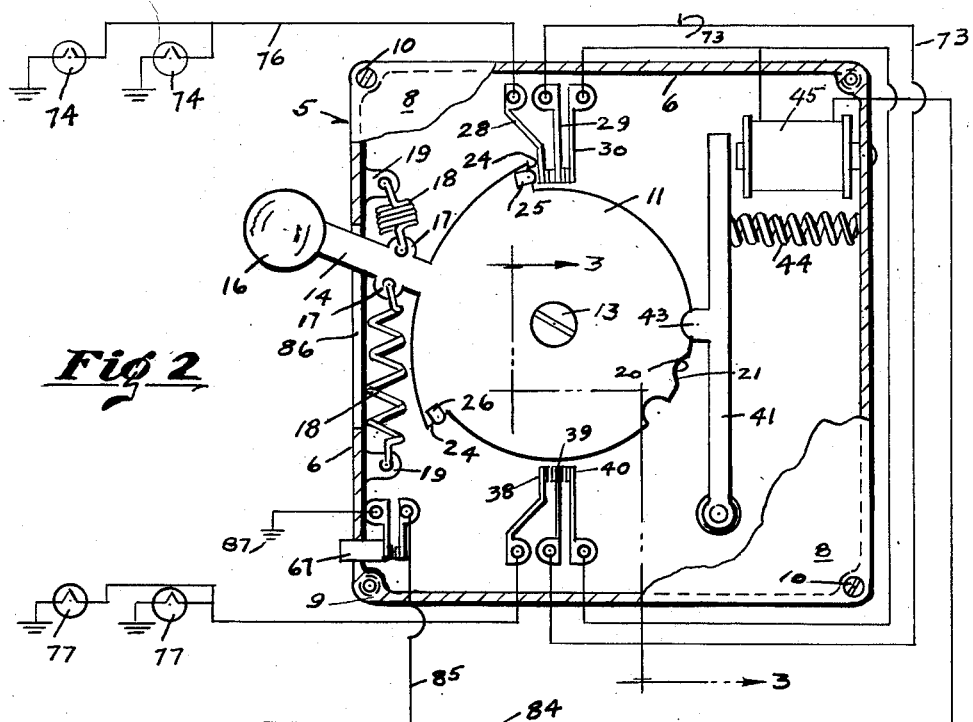
Fig 2
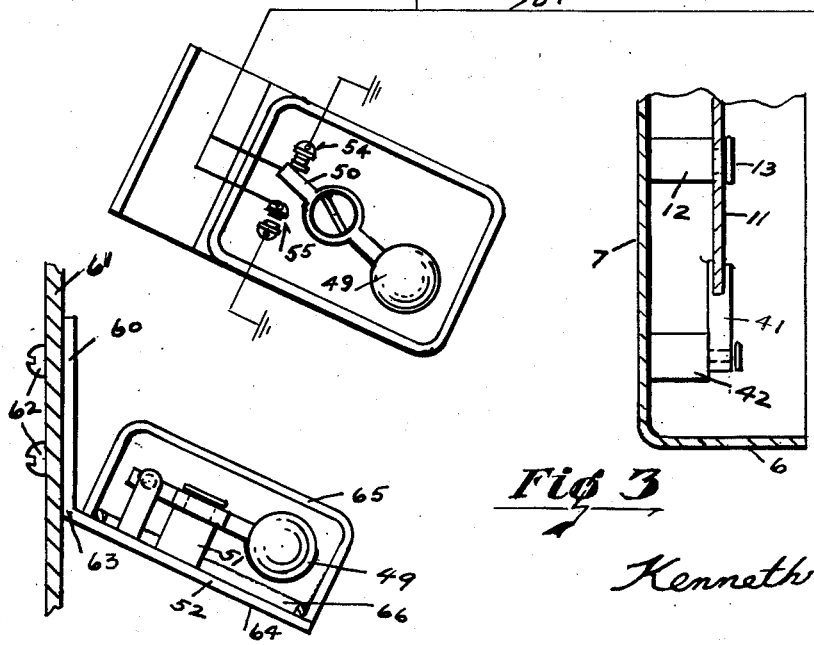
Fig 3
Fig 4
Kenneth R. Batt
INVENTOR
BY John H. Gaynor
ATTORNEY Patented Dec. 26, 1950

2,535,384

UNITED STATES PATENT OFFICE 2,535,384

INERTIA CUTOFF SWITCH FOR VEHICLES

Kenneth R. Batt, North Tonawanda, N. Y.

Application June 2, 1949, Serial No. 96,683

13 Claims. (Cl. 171—97)

The invention relates to a vehicle signal system, particularly to an inertia cut-off switch forming part of the system and responsive to the turning movement of the vehicle to automatically shut off turn-indicating lamps carried by the vehicle.

The invention contemplates the provision of a vehicle signal system having right and left indicating circuits including indicating lamps in each circuit and a manually operated circuit closer normally biased in a neutral open-circuit position for selectively closing either circuit to light the respective indicating lamps. Latch means are provided, including an armature under control of a solenoid, for maintaining said circuit closer in a selected circuit closing relation with one of the indicating circuits.

The invention further contemplates a centrifugally actuated switch responsive to the turning movement of the vehicle and including a circuit corelated with said indicator circuits and the solenoid for energizing the solenoid to release the latch means and surrender the circuit closer to the energy of the biasing means to open the selected closed indicator circuit and extinguish the lamps.

The invention still further contemplates the provision of an auxiliary circuit, including a push button circuit closer, for energizing the solenoid to release the latch means without the aid of the centrifugally actuated switch when the contemplated turning movement is not accomplished.

The invention still further contemplates the provision of a vehicle signal system of the character described, including the inertia switch, which is cheap to manufacture, simple to operate, and efficient in performance.

Other objects and advantages of the invention will become apparent during the course of the following specification, and accompanying drawings, forming part of the specification, and in which like numerals are used to designate like parts throughout.

In the drawings:

Fig. 2 is a plan view generally similar to Fig. 1 but with the source of power omitted, showing the respective switches in the positions assumed when the vehicle is making a right turn.

Fig. 3 is a fragmentary cross-section through the hand operated switch housing, taken substantially on line 3—3 of Fig. 2.

Fig. 4 is a longitudinal section through the inertia switch and mounting bracket, some of the parts being shown in elevation, and particularly illustrating the preferred angular relation between the switch-supporting bracket and the vehicle fire-wall.

Figure 1:
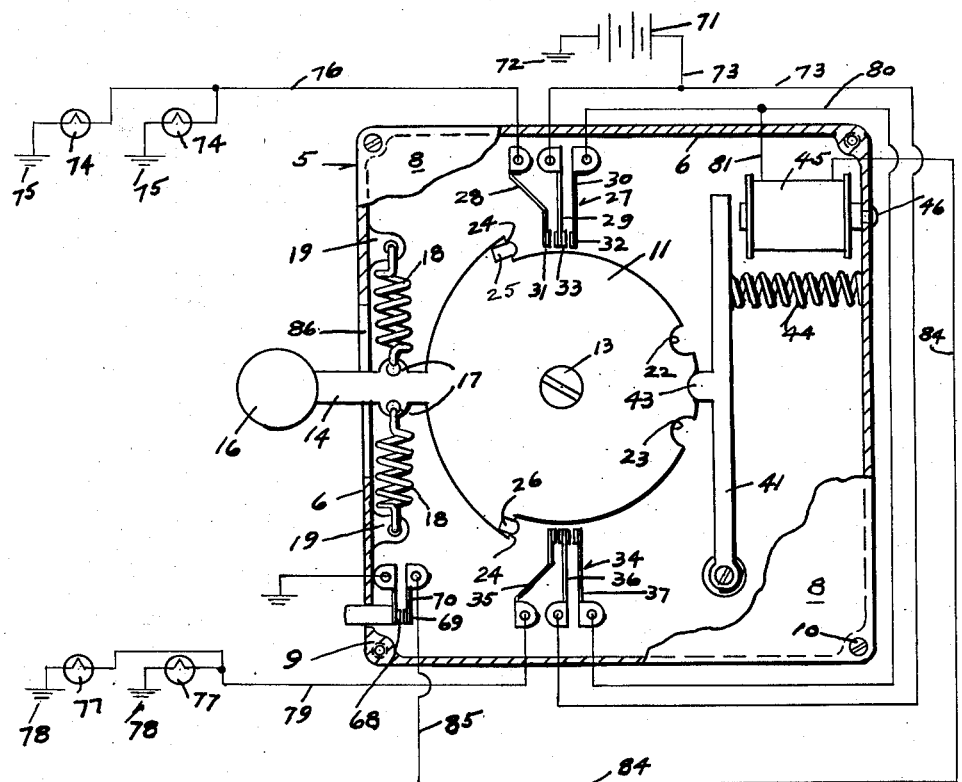
Fig. 1 is a plan view of a preferred embodiment of the invention, including a diagrammatic layout of the operating circuits, part of the respective switch housings being removed for clarity of illustration, the hand operated switch and inertia switch being each shown in a neutral position as assumed by the respective switches when the vehicle is proceeding straight ahead.
Figure 1:
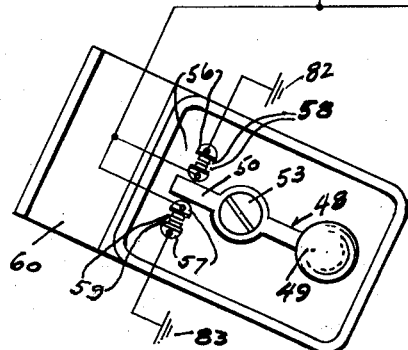

Referring now in detail to the drawings and particularly to Figs. 1 and 2, the numeral 5 refers generally to a substantially rectangular box preferably formed of metal and arranged with conventional circumscribing sidewalls 6 and a bottom 7 therebetween and attached thereto. A removable cover 8, shown partially in Figs. 1 and 2, is provided and may be conveniently secured to enlarged portions of intersecting sidewalls, as shown at 9, by means of a plurality of screws 10. Box 5 provides a housing for all of the mechanism except the inertia switch to be described later, and may be mounted on a motor vehicle wherever convenient to the driver, but preferably on the steering column.

A circuit closer 11, preferably in the form of a disk as shown, is rotatably mounted on a pin 12 secured to bottom 7 and disposed in a plane normal to the axis thereof. Disk 11 is secured on pin 12 by a threaded stud 13. A radially extending lever arm 14 is formed integrally with disk 11 and projects outwardly of box 5 through an elongated slot 86 in one of the sidewalls 6. A knob 16 adapted to be gripped by the hand is mounted on the free end of lever 14. A pair of integral ears 17—17 formed on opposite sides of lever arm 14 within box 5 cooperate with a pair of spaced lugs 19—19 on sidewall 6 in providing anchoring means for a pair of opposed tension springs 18—18 which bias lever arm 14 in a central or neutral position.

A shallow indentation 20 having a rounded marginal portion 21 to provide a camming surface is formed in the perimeter of disk 11 in axial alignment with lever arm 14. A pair of relatively deeper indentations 22 and 23 are also formed in the perimeter of disk 11, one on each side of indentation 20 and spaced equally therefrom.

A portion of disk 11 on each side of lever arm 14 is cut away to provide shoulders 24—24 spaced equally circumferentially from lever arm 14 to provide supports for a pair of pressure members 25 and 26 adapted to rotate with disk 11.

Switch 27 is mounted on base 7 and arranged with three parallel resilient arms 28, 29 and 30 having contact points adjacent the free ends thereof. Arms 28 and 30 are provided with single contact points 31 and 32 directed inwardly and toward each other. A double contact point 33 is provided on intermediate arm 29. Arms 28, 29 and 30 will lie in the path of pressure member 25 when disk 11 is rotated to indicate a turn to the right.

A similar switch 34 having parallel resilient arms 35, 36 and 37 is mounted on bottom 7 on the opposite side of disk 11 adapted to lie in the path of pressure member 26 when the disk is rotated to indicate a left turn. Contact points 38, 39 and 40, arranged similarly to contact points 31, 33 and 32, are disposed on arms 35, 36 and 37, respectively.

An armature 41 of magnetic material is suitably mounted for oscillation on bottom 7, as by pivot pin 42. An integral detent 43 having a rounded free end and disposed so as to be in registry with indenture 20 when lever arm 14 is in a neutral position projects from the side of armature 41 adjacent disk 11. Detent 43 is normally urged into engagement with indenture 20 by a compression spring 44 attached to the opposite side of the armature and the adjacent sidewall 6, as clearly shown in Figs. 1 and 2. Detent 43, through its engagement in indenture 20, cooperates with tension springs 18 in preventing unintentional engagement of the pressure members with switches 27 and 34. When engaged in either of the indentures 22 or 23, as will be explained, the detent retains disk 11 in circuit-closing relation with one of the lighting circuits.

An electro-magnet or solenoid 45 is conveniently mounted in box 5 by a connecting member 46, or in any other suitable manner. Solenoid 45 is disposed with its core adjacent armature 41.

I am aware that switching systems having elements generally similar to certain parts of the aforedescribed switching mechanism have been in use heretofore. I am also aware that some of these signal systems have employed so-called automatic cut-off switches responsive to the turning movement of the vehicle to turn off the signal indicating lamps of the system. On the whole, however, the switches employing automatic shut off means require a complicated system of wiring, and are so frequently out of order that auxiliary manually-operated mechanism must be included in the system to insure their proper functioning.

In the inertia switch of my invention I provide a completely automatic shut off switch which is simple in operation and very difficult to get out of order. Auxiliary manual operating mechanism is not required since my switch operates in coordinated cooperation with the lighting circuits.

In the preferred embodiment of my inertia switch as shown in Figs. 1, 2 and 4, the numeral 48 designates a pendulum lever arranged with a weighted end 49 having a lever arm 50 extending radially therefrom. Pendulum 50 is mounted for oscillation on a pivot pin 51 rigidly affixed to a bracket 52 and is secured against displacement by a screw 53. A pair of switches 54 and 55 are also mounted on bracket 52, one said switch on each side of lever arm 50 adjacent the free end thereof. Switches 54 and 55 are provided with resilient arms 56 and 57, respectively, having respective contact points 58 and 59 at their outer ends. Switches 54 and 55 are conveniently grounded at 82 and 83, respectively.

Bracket 52 is bent intermediate its ends, as at 63, to provide an end portion 60 adapted to be secured on a vertical portion of the vehicle firewall 61 by means of a plurality of bolts or rivets 62.

While my inertia switch will function in the manner to be described when hung vertically from the firewall, I have found by experiment that more satisfactory operation is obtained when the pendulum lever is suspended at an angle of approximately 20 degrees below the horizontal. When the pendulum is suspended vertically there is a tendency for the pendulum to oscillate when the vehicle is traveling on rough roads and unintentionally closing the circuit through the solenoid. Therefore, I bend bracket at 63 so that the pendulum supporting portion 64 is disposed at an angle of approximately 70 degrees from the vertical face of the firewall, as clearly shown in Fig. 4.

A cover 65 is provided for the inertia switch, supported on portion 64 and held against displacement by a circumscribing bead 66, or in any other convenient manner.

Upon occasion the driver of the vehicle may change his mind about making a turn after he has closed a selective lighting circuit by means of disk 11. I have provided means for opening the circuit and resetting the disk in its neutral position, said means including a push button 67 projected through a suitable opening in wall 6 adjacent lever arm 14 and grounded to the vehicle at 87. Push button 67 is provided with a contact point 68 arranged to engage contact point 69 carried by a fixed arm 70 mounted on bottom 7 and connected to the magnet 45 as will be described.

The various wiring circuits essential to the complete signal system are shown diagrammatically in Figs. 1 and 2. It will be noted that a lighting circuit is provided for separate lights which may be suitably mounted on the vehicle to indicate the intention of the operator to turn in a definite direction, either to the right or to the left. These lights are connected to a source of electrical energy. It will also be noted that the lighting circuits are correlated through connected conductors to the inertia switch mechanism and to the push button mechanism.

Power to operate the signal system may be supplied by a battery 71 or any other source of electrical energy. The battery is suitably grounded as indicated at 72, for example, to the frame of the vehicle. Current from battery 71 is carried through a conductor 73 to the intermediate arms 29 and 36 of switches 27 and 34, respectively.

A pair of signal lamps 74 grounded as indicated at 75, are mounted on the vehicle and connected to arm 28 by conductor 76. A circuit to light lamps 74 is closed when contact point 31 is brought into contacting relation with contact point 33. When lamps 74 are lighted, a turn to the right is indicated. A similar pair of signal lamps 77 shown grounded at 78 are connected to arm 35 by conductor 79 and are lighted when contact points 38 and 39 are brought into contacting relation. Lamps 77 when lighted indicate a turn to the left.

The electro-magnet 45 is connected to arms 30 and 37 by conductors 80 and 81; and to switches 54 and 55 through conductor 84. Arm 70 is connected to conductor 84 through conductor 85.

As hereinbefore stated, the operation of my signal system is simple. For example, we may assume that the driver intends to make a right turn and accordingly moves lever 14 upwardly. Rotation of disk 11 will force detent 43 out of its engagement in indentation 20 against the energy of spring 44 through the cooperation of cam edge 21. Pressure member 25 is carried forward by disk 11 and contact points 31 and 33 are brought into contacting relation, closing the lighting circuit through conductors 73 and 76. Contact points 33 and 32 are also in contact and current is flowing through conductors 80 and 81 to magnet 45, and from the magnet through conductor 84 to switches 54 and 55. In the meantime, detent 43 has been forced into indentation 22 by spring 44 to hold the lighting circuit closed. Lamps 74 remain lighted.

The turning movement of the vehicle has set up the inertia of the pendulum 48 which will oscillate on its pivot 51 due to centrifugal force and will swing from the position shown in Fig. 1 to that shown in Fig. 2. The free end of lever arm 50 will press against arms 56 and bring contacts 58 into circuit closing relation, whereupon magnet 45 becomes energized. Armature 41 lying in the effective flux of magnet 45 is attracted thereto and detent 43 is withdrawn from its engagement in indenture 22. Disk 11 is counter-rotated to its original position by springs 18, releasing the pressure of member 25 upon the arms of spring 27 so that the said arms, due to their resiliency, return to their original positions of rest. The circuit between switch 27 and battery 71 is now opened. Cutting off the current deenergizes the magnet 45 and frees the armature. Detent 43 is forced back into its original engagement in indenture 20 by spring 44. When the turning movement of the vehicle is accomplished, gravitation centralizes the switch and pendulum 48 will swing back to its initial position.

If the turn had been to the left, it is obvious that the operation would have been similar but in a reverse direction. Pressure member 26 would have been pressed upon the arms of switch 34 to close the circuit to lamps 77, and detent 43 would have been engaged in indenture 23 to hold the circuit closed. Magnet 45 would be energized when lever arm 50 brought contacts 59 together. The subsequent withdrawal of detent 43 from indenture 23 by the attraction of armature 41 to magnet 45 would have opened the lighting circuit in the manner already described.

Let us assume that the operator has moved lever 14 to light signal lamps 74 to indicate, for example, a right turn and later wishes to cancel the signal without making the turn. Contacts 68 and 69 are brought together by manual pressure on button 67. This will close a circuit through conductors 85 and 84 to energize magnet 45. The armature 41 will then be withdrawn from its engagement in indenture 22 and springs 18 will return disk 11 to its neutral position to open the lighting circuit, in the same manner heretofore described when magnet 45 is energized by the inertia switch.

Although I have described and illustrated the inertia member of my signal cut-off switch as a pendulum, it is to be understood that I am not limiting myself to this means. The concept of my invention comprehends the use of an inertia member responsive to centrifugal force set up in response to the turning movement of a vehicle to close a circuit coordinated with the lighting circuit and using the same source of electrical energy through an electro-magnet. Accordingly, any form of centrifugal switch operating as described may be used, as for example, a rod having a sliding member adapted for translative movement along said rod to bring a pair of contact points together to close the circuit or a mercury globule confined in a hollow tube adapted to move in a direction contrary to the turning direction of the vehicle to contact electrodes projecting into the glass tube and in circuit relation with the lighting system as described.

Having thus described my invention, I claim:

1. An inertia cut-off switch for a vehicle signal light system comprising a plurality of switches adapted for operative connection to said light system, a manual circuit-closer arranged to operate the switches, spring means normally biasing the circuit-closer in open circuit relation relative to the switches, latch means adapted to engage and maintain the circuit-closer in circuit-closing relation with the switches against the energy of the biasing means, an auxiliary circuit including an electro-magnet for releasing the latch means from its engagement with the circuit-closer and a pair of spaced apart circuit-closing switches connected to the first mentioned switches, and a dependent inertia member freely mounted for oscillation between the spaced apart switches, said inertia member being responsive to the turning movement of the vehicle to engage one of the spaced apart switches to close the auxiliary circuit and energize the electro-magnet, whereby the latch means is released and the circuit-closer is surrendered to the energy of the biasing means to be returned to its normal open circuit relation.

2. The structure of claim 1 in which the inertia member comprises a pendulum lever mounted for oscillation in a direction opposite to the turning direction of the vehicle, said lever having a weighted head and a radially extending arm adapted to engage one of the spaced apart switches to close said switch and energize the electro-magnet.

3. The structure of claim 2 in which the inertia member is mounted on the vehicle at a dependent angle of substantially 20 degrees from the horizontal.

4. The structure of claim 3 in which push-button means are provided for energizing the electro-magnet independently of the inertia member, including a push-button conveniently mounted on the vehicle, a circuit-closing switch activated by the push-button and a circuit connecting the last mentioned switch with the auxiliary circuit.

5. An inertia cut-off switch for a vehicle signal light system comprising a signal box, a rotatable member having a pair of spaced notches in its periphery mounted in said box, a pair of circumferentially spaced pressure members on the opposite marginal edges of the rotatable member, a plurality of switches in said box arranged for operative connection to the vehicle light system, a pair of said switches being disposed in the respective paths of the individual pressure members for selective closing of an indicator circuit when contacted by the adjacent pressure member, spring means normally biasing the pressure member away from the switches, a pivotally mounted armature in the box adjacent the rotatable member, said armature having a spring urged detent alternately engageable in one of the notches to maintain a pressure member in circuit-closing contact with a said pair of switches against the energy of the biasing means, a solenoid in the box for withdrawing the detent from the notch, the solenoid being so disposed that the armature will lie in its effective flux when energized, an auxiliary circuit correlated with each pair of switches and the solenoid, including a pair of spaced apart circuit-closing switches, for energizing the solenoid, and a centrifugally actuated circuit-closer between the spaced apart switches, said circuit-closer being responsive to the turning movement of the vehicle to contact one of the spaced apart switches to close the auxiliary circuit and energize the solenoid.

6. The structure of claim 5 in which push-button means are provided for energizing the solenoid independently of the centrifugally actuated circuit-closer, including a circuit-closing switch actuated by the push-button and a secondary circuit interconnected with the auxiliary circuit.

7. The structure of claim 6 in which the centrifugally actuated circuit-closer comprises a pendulum lever including a planiform member terminating in a weighted element at one of its ends pivotally mounted for free oscillation between the spaced apart switches, said pendulum lever being responsive to the turning movement of the vehicle to swing on its pivot, said spaced apart switches lying in the respective paths of rotation of the free end of the planiform member during oscillation whereby one said switch is contacted thereby to close the auxiliary circuit and energizes the solenoid.

8. The structure of claim 7 in which a bracket is provided for supporting the centrifugally actuated circuit-closer, said bracket including a portion adapted for mounting on a vertical portion of the vehicle and an integral portion disposed in an angular relation to the vertical of substantially 70 degrees upon which the circuit-closer is pivotally mounted.

9. An inertia cut-off switch for use with a vehicle signal system having right and left turn indicating lamps comprising a plurality of switches arranged in pairs and adapted for connection to the respective right and left indicating lamps, a manually controlled circuit-closer normally biased in a neutral position relative to the switches and operable to selectively close either pair of said switches, a latch adapted to engage said circuit-closer and maintain said circuit-closer in its selective circuit-closing relation, an electro-magnet for disengaging the latch and releasing the circuit-closer to the energy of the biasing means, a centrifugally actuated switch, including a pair of spaced apart circuit-closing switches and a pendulum lever mounted therebetween responsive to the turning movement of the vehicle to close one of the said last mentioned switches and an electrical circuit through the electro-magnet connecting the respective pairs of first mentioned switches and the spaced apart switches of the centrifugally actuated switch.

10. The structure of claim 9 in which the centrifugally actuated switch, including the pendulum lever and the spaced apart switches are supported on a bracket having a base portion adapted for vertical mounting on a vehicle and an integral angularly disposed dependent portion upon which the several elements of the switch are mounted, the angular relation between said portions being such that the pendulum lever will lie in an inclined plane of substantially 70 degrees from the vertical when the bracket is mounted on a vehicle.

11. An inertia cut-off switch for a vehicle comprising a signal box having a bottom portion and circumscribing sidewalls, a plurality of circuit-closing switches mounted on said bottom portion and arranged in pairs adjacent opposite sidewalls, a manually controlled circuit-closer rotatably mounted in the box between the respective pairs of switches, a pair of circumferentially spaced pressure members on the circuit-closer, said circuit-closer being movable to a selective position wherein one said pressure member will engage and close an adjacent pair of switches, spring means normally biasing the circuit-closer in a neutral position relative to the switches, a paramagnetic latch pivotally mounted on the bottom portion adjacent the circuit-closer, including an integral spring urged detent, means on the circuit-closer for engaging the detent to maintain the circuit-closer in a selective position with a said pressure member in circuit-closing relation with a said pair of switches against the energy of the spring biasing means, a solenoid for withdrawing the detent from its engagement with the circuit-closer, said solenoid being so arranged that the latch will lie within the effective flux of the solenoid when energized, a pivotally mounted centrifugally actuated second circuit-closer including a pendulum lever having a weighted head and a radially extending planiform portion, a pair of spaced apart circuit-closing switches mounted on opposite sides of the planiform portion, said pendulum lever being responsive to the turning movement of the vehicle to engage a said spaced apart switch to close a circuit, and an electric circuit interconnecting the respective pairs of first mentioned circuit-closing switches and the last mentioned spaced apart switches through the solenoid.

12. The structure of claim 11 in which push-button means are provided for energizing the solenoid independently of the centrifugally actuated second circuit-closer and associated switches, including a conveniently mounted push-button, an auxiliary circuit interconnected with the electric circuit through the solenoid, and a circuit-closing switch actuated by the push-button.

13. The structure of claim 12 in which means are provided for mounting the pendulum including a bracket bent intermediate its ends, one portion of the bracket being adapted for vertical mounting on a vehicle, the other said portion being bent relative to the first mentioned portion so that the pendulum lever mounted thereon in parallel relation thereto will depend at an angle of substantially 20 degrees from the horizontal.

KENNETH R. BATT.

REFERENCES CITED

The following references are of record in the file of this patent:

UNITED STATES PATENTS

| Number | Name | Date |
|---|---|---|
| 1,572,147 | Junghans et al. | Feb. 9, 1926 |
| 1,779,799 | Blum | Oct. 28, 1930 |
| 2,432,388 | Curtiss | Dec. 9, 1942 |